United States Patent
Oonishi et al.

(10) Patent No.: US 9,000,635 B2
(45) Date of Patent: Apr. 7, 2015

(54) ALTERNATOR WITH ENGAGED HEAT SINKS AND RECTIFIER BOARD

(75) Inventors: Toshiyuki Oonishi, Minato-ku (JP); Kazunori Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 324 days.

(21) Appl. No.: 12/964,197

(22) Filed: Dec. 9, 2010

(65) Prior Publication Data

US 2011/0285255 A1  Nov. 24, 2011

(30) Foreign Application Priority Data

May 24, 2010  (JP) .................................. 2010-117881

(51) Int. Cl.
H02K 11/04  (2006.01)
(52) U.S. Cl.
CPC .................................. H02K 11/046 (2013.01)
(58) Field of Classification Search
CPC ............................ H02K 11/048; H02K 11/046
USPC ........................................ 310/68 D, 68 R, 71
See application file for complete search history.

(56) References Cited

U.S. PATENT DOCUMENTS

| | | | | |
|---|---|---|---|---|
| 3,684,944 | A | * | 8/1972 | Evgrafov et al. ............. 363/126 |
| 4,952,829 | A | * | 8/1990 | Armbruster et al. ......... 310/68 D |
| 5,331,231 | A | * | 7/1994 | Koplin et al. ............... 310/68 D |
| 5,652,471 | A | * | 7/1997 | Mayer et al. ................. 310/68 D |
| 6,198,188 | B1 | | 3/2001 | Ihata |
| 7,535,137 | B2 | | 5/2009 | Ikuta et al. |
| 2002/0136041 | A1 | * | 9/2002 | DeNardis ..................... 363/144 |
| 2004/0263007 | A1 | * | 12/2004 | Malanga et al. ............... 310/52 |
| 2007/0262680 | A1 | | 11/2007 | Ikuta et al. |
| 2008/0290763 | A1 | | 11/2008 | Oohashi et al. |
| 2008/0316786 | A1 | | 12/2008 | Murakami et al. |
| 2009/0134749 | A1 | * | 5/2009 | Nakamura et al. .......... 310/68 D |

FOREIGN PATENT DOCUMENTS

| | | |
|---|---|---|
| JP | 2000-253625 A | 9/2000 |
| JP | 3956524 B2 | 9/2000 |
| JP | 2007-306730 A | 11/2007 |
| JP | 2008295115 A | 12/2008 |
| JP | 2009027906 A | 2/2009 |

OTHER PUBLICATIONS

Japanese Office Action (Reasons for Rejection) issued Apr. 24, 2012, in Patent Application No. 2010-117881.
Japanese Office Action dated Sep. 3, 2013 issued in corresponding Japanese Patent Application No. 2012-150046.

* cited by examiner

Primary Examiner — Quyen Leung
Assistant Examiner — Eric Johnson
(74) Attorney, Agent, or Firm — Sughrue Mion, PLLC

(57) ABSTRACT

An alternator is provided with a rectifier including a positive-side and a negative-side heatsink that cool rectifier elements corresponding to each heatsink and a circuit board that holds the positive-side and the negative-side heatsink, wherein one of either the positive-side and the negative-side heatsink or the circuit board is provided with engaging holes, and the other with engaging protrusions that are engaged with the holes.

18 Claims, 7 Drawing Sheets

ALTERNATOR WITH ENGAGED HEAT SINKS AND RECTIFIER BOARD

BACKGROUND OF THE INVENTION

1. Field of the Invention

The present invention relates to an alternator provided with a rectifier that converts into d-c voltage a-c voltage induced by an armature winding, for example.

2. Description of the Related Art

A rectifier of a conventional alternator for a vehicle is made up of a positive-side heatsink mounted with positive-side diodes, a negative-side heatsink mounted with negative-side diodes, and a circuit board including electrodes for electrically connecting the positive-side and the negative-side diodes with each other, and in order to enhance workability during the process until the rectifier is mounted onto a rear bracket of the alternator, those constituent parts are in some cases temporarily fixed thereon using rivets and the like (see, for example, Japanese Patent No. 3956524, FIG. 3 Page 6, hereinafter referred to as Patent Document 1).

In a conventional alternator as described above, when temporarily fixing the rectifier, parts for the temporary fixing are required, which has in turn caused problems in that manufacturing costs are pushed up, as well as its assembly workability is lowered.

SUMMARY OF THE INVENTION

The present invention has been made to solve problems with the conventional technology described above, and aims at providing an alternator that doesn't need any parts for temporarily fixing the rectifier, and can be assembled easily at low costs.

An alternator according to the present invention comprises a rectifier including a positive-side and a negative-side heatsink that cool rectifier elements corresponding to each heatsink and a circuit board that holds the positive-side and the negative-side heatsink, wherein one of either the positive-side and the negative-side heatsink or the circuit board is provided with engaging holes, and the other with engaging protrusions that are engaged with the holes.

According to the present invention, no parts other than the positive-side and the negative-side heatsink and the circuit board are required for temporary fixing. In addition, the circuit board serves also as an insulator between the positive-side and the negative-side heatsink, so that manufacturing costs therefor can be eliminated.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Embodiment 1.

Figure 1:
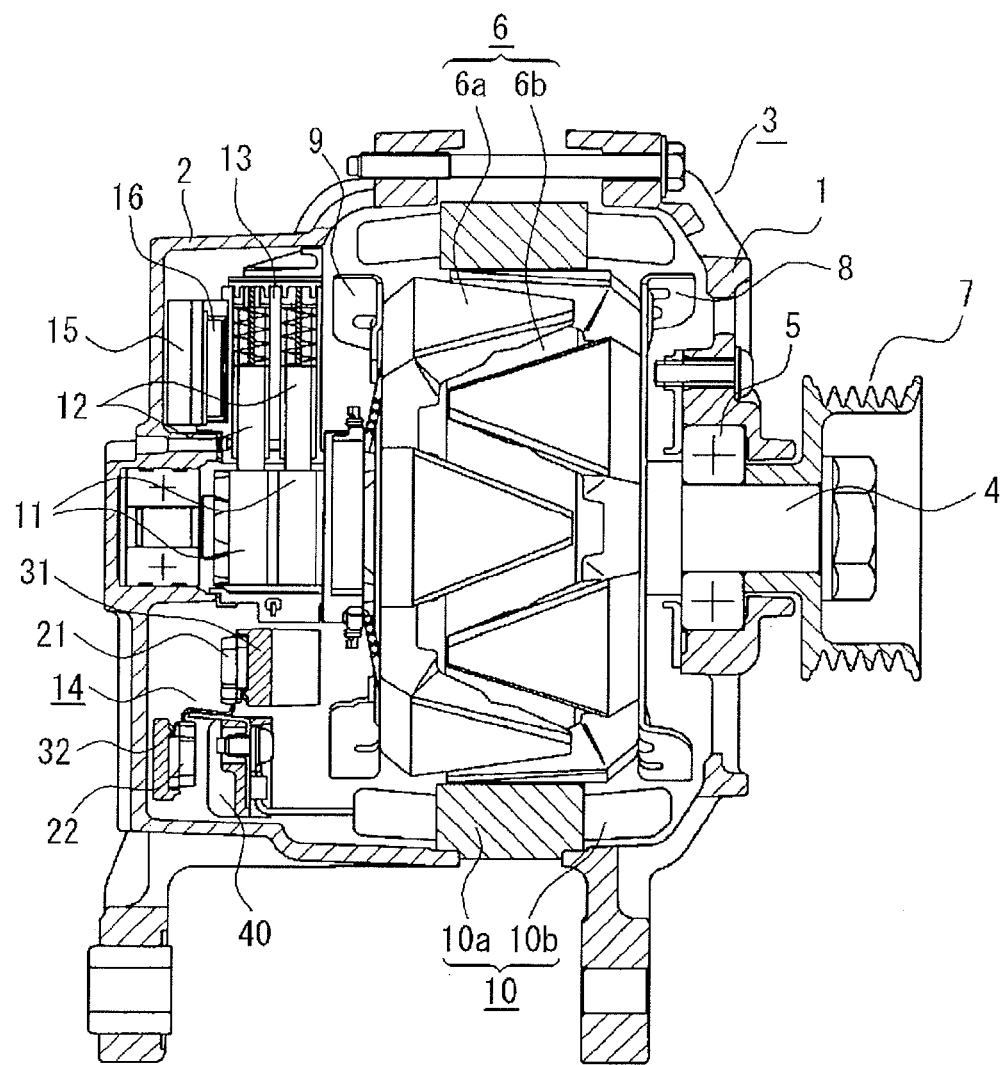
FIG. 1 is a longitudinal cross sectional view showing an alternator for a vehicle, which is an alternator according to Embodiment 1 of the present invention.
Figure 2:
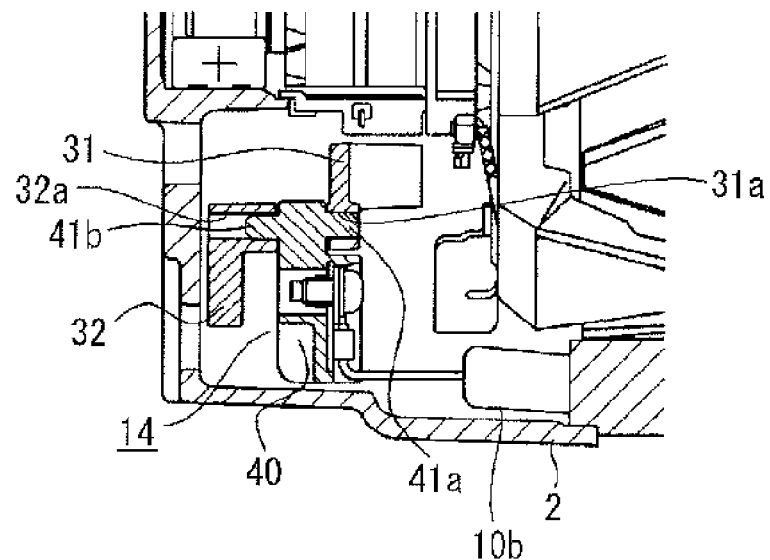
FIG. 2 is a cross sectional view of a portion at which a positive-side and a negative-side heatsink of a rectifier shown in FIG. 1 are fixedly held by a circuit board.
Figure 3A:
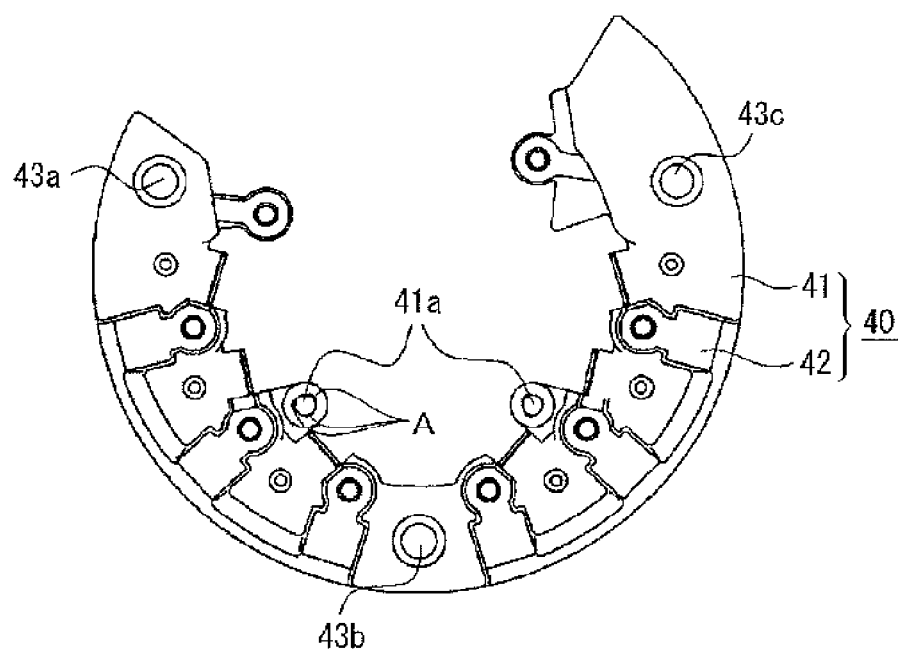
FIG. 3A is a view showing the circuit board constituting the rectifier shown in FIG. 1 being viewed from the front side thereof.
Figures 3B, 3C:
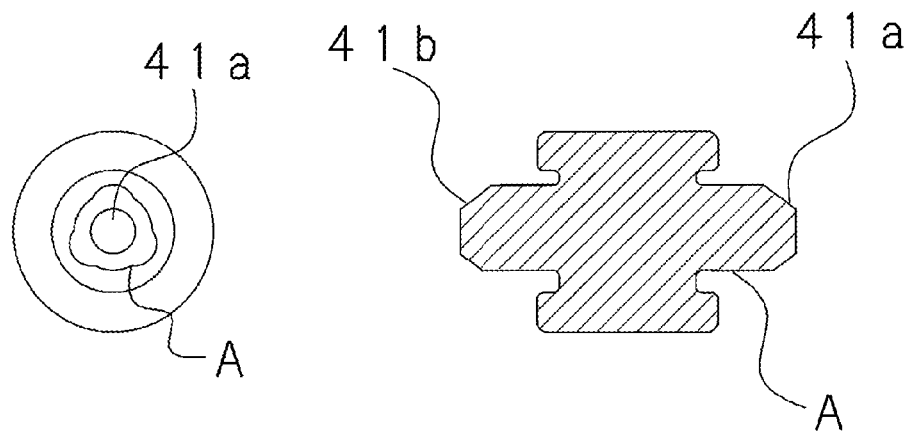
FIG. 3B is a close-up view of a portion of FIG. 3A.
FIG. 3C is a close-up view of a portion of FIG. 2.

FIG. 1 is a longitudinal cross sectional view showing an alternator for a vehicle, which is an alternator according to Embodiment 1 of the present invention; FIG. 2 is a cross sectional view of a portion at which a positive-side and a negative-side heatsink of a rectifier shown in FIG. 1 are fixedly held by a circuit board; and FIG. 3 is a view showing a circuit board constituting the rectifier shown in FIG. 1 being viewed from the front side thereof. Here, the same reference numerals are given to the same or corresponding parts in each drawing.

In the figure, the alternator for a vehicle includes: a case 3 made up of a front bracket 1 and a rear bracket 2, both of which are approximately bowl-shaped and made of aluminum; a rotor 6 that is disposed rotatably inside the case 3, with its shaft 4 being held by the case 3 via a bearing 5; a pulley 7 that is fixed to the front end of the shaft 4 extending toward the front side of the case 3; a front fan 8 and a rear fan 9 that are fixed to both axial end faces of the rotor 6; a stator 10 that surrounds the circumferential face of the rotor 6, keeping a constant air gap to the rotor, and is fixed inside the case 3; a pair of slip rings 11 that is fixed in the rear side of the shaft 4 and through which a current is supplied to the rotor 6; a pair of brushes 12 that slides on the respective surfaces of the slip rings 11; a brush holder 13 that insulates and holds the brushes 12; a rectifier 14 that converts into a d-c voltage a multi-phase a-c voltage generated by the stator 10; and a voltage regulator 16 that is fixed on a cooling member 15 engaged with the brush holder 13 and regulates the magnitude of the a-c voltage generated by the stator 10.

The stator 10 includes a cylindrical stator core 10a and a stator coil 10b that is wound around the stator core 10a, and generates the a-c voltage in response to variation in magnetic flux attributed to the rotor rotation. The rotor 6 includes a field coil 6a that produces magnetic flux with an excitation current flowing therethrough, a pole core 6b that is provided to cover the field coil 6a and forms magnetic poles by the magnetic flux, and a shaft 4 that is inserted through the pole core 6b at the center thereof. In addition, the front fan 8 and the rear fan 9 are fixed by welding and the like on both axial end faces of the pole core 6b.

The configuration of the rectifier 14 will be explained next. The rectifier 14 includes: a positive-side diode 21 as an rectifier element; a negative-side diode 22 as the same; an arc-shaped positive-side heatsink 31 that has a radiation fin and holds the positive-side diode 21; an arc-shaped negative-side heatsink 32 that also has a radiation fin and holds the negative-side diode 22; and a circuit board 40 that electrically connects the positive-side diode 21 and the negative-side diode 22 with the winding ends of the stator coil 10b. Moreover, diodes used for the positive-side diode 21 and the negative-side diode 22 generally number as many as needed to full-wave rectify the multi-phase a-c voltage generated by the stator 10; however, in FIG. 1, only one diode for each is illustrated corresponding to the cross sectional view.

The circuit board 40 includes a resin mold formed approximately in a horseshoe shape as shown in FIG. 3, and is provided with engaging protrusions 41a, which are formed of an insulation resin portion 41 to fixedly hold the positive-side heatsink 31, at two locations distant from each other along the inner circumferential side in the front side thereof (front side of this document). In addition, the circuit board is provided as shown in FIG. 2 with engaging protrusions 41b, which are similarly formed of the insulation resin portion 41 to fixedly hold the negative-side heatsink 32, at two locations back to back on the opposite side (rear side) of the engaging protrusions 41a. Moreover, those engaging protrusions 41a and 41b may be cylindrical; however, in this Embodiment, the protrusions have a triangular cross section and are provided with a plurality of rib-like ridges A formed on the outer circumferential surface thereof at circumferentially equal intervals. Moreover, since the circuit board 40 is provided with the engaging protrusions 41a and 41b, when molding, releasability of workpieces from the molding die becomes worse; however, the releasability can be improved by providing knockout pins at locations corresponding to the tips of either the engaging protrusions 41a or 41b.

Meanwhile, the positive-side heatsink 31 is provided with engaging holes 31a (see FIG. 2), at locations corresponding to the engaging protrusions 41a, into which the engaging protrusions 41a are press-fitted. Similarly, the negative-side heatsink 32 is provided with engaging holes 32a (see FIG. 2), at locations corresponding to the engaging protrusions 41b, into which the engaging protrusions 41b are press-fitted. The outer diameters of the engaging protrusions 41a and 41b are made larger than the inner diameters of the engaging holes 31a and 32a, respectively, and both of the positive-side heatsink 31 and the negative-side heatsink 32 are thereby fixed by press-fitting to the circuit board 40.

Furthermore, the circuit board 40 is provided with fixing hole 43a, 43b and 43c, located apart from each other at an angle of approximately 120°, through which bolts (not shown in the figure) are inserted to fasten itself onto the rear bracket 2, with the positive-side heatsink 31 and the negative-side heatsink 32 being held by the engaging protrusions 41a and 41b, respectively. The fixing hole 43a, 43b and 43c are all made in the insulation resin portion 41. The positive-side heatsink 31 and the negative-side heatsink 32, both shaped in an arc, are disposed separately on both sides of the circuit board 40, interposing therebetween the circuit board 40, and fastened together with the board onto the rear bracket 2, with bolts (not shown in the figure) inserted through the fixing hole 43a, 43b and 43c, keeping those heatsinks electrically insulated from the rear bracket 2. A plurality of metal portions 42 that serves as connections and the like with the wiring ends of the stator coil 10b is exposed at predetermined locations on the circuit board 40.

Figure 9:
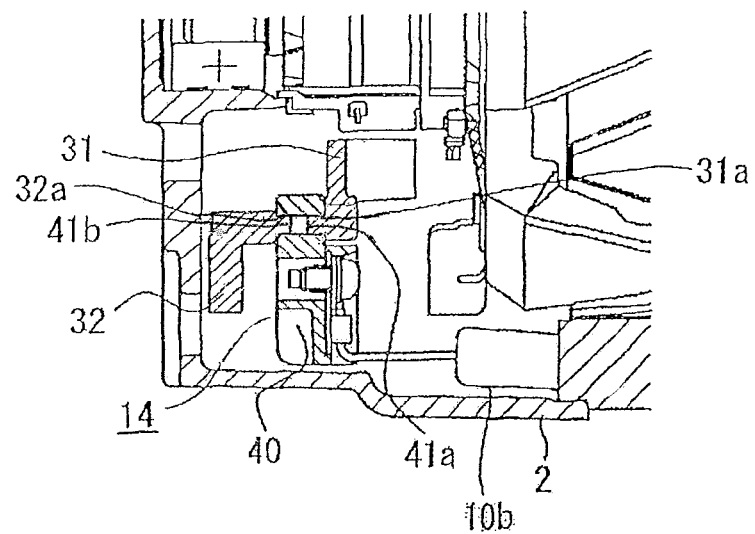
FIG. 9 is a cross sectional view of an alternative embodiment of the invention.

Moreover, the relation between the engaging holes 31a and 32a, and the engaging protrusions 41a and 41b may be reversed from the above-described relation, that is, the engaging holes 31a and 32a may be made in the circuit board 40, and the engaging protrusions 41a and 41b may be formed on the positive-side heatsink 31 and the negative-side heatsink 32, respectively, as shown in FIG. 9. Furthermore, the engaging holes 31a and 32a may be combined with the engaging protrusions 41a and 41b, and provided on both holding side and held side so as to be engaged with each other. In other words, the engaging holes may be made in one of either the positive-side heatsink 31 and the negative-side heatsink 32 or the circuit board 40, and the engaging protrusions may be formed on the other so as to be engaged with the holes. Moreover, the engaging protrusions 41 a each formed on the circuit board 40 are located at an approximately intermediate point between the fixing hole 43a and 43b and that between the fixing hole 43b and 43c. Since configurations other than the above are the same as those using conventional technology, their explanation will be omitted.

In Embodiment 1 configured as described above, when assembling the rectifier 14, the heatsinks and the circuit board can be readily unified only by press-fitting into the engaging holes 31a made in the positive-side heatsink 31 the engaging protrusions 41a formed on the circuit board 40 at locations corresponding to the holes, and press-fitting into the engaging holes 32a made in the negative-side heatsink 32 the engaging protrusions 41b formed on the circuit board 40. Moreover, the assembled rectifier 14 is fastened onto the case 3 including the rear bracket 2, together with the positive-side heatsink 31 and the negative-side heatsink 32, with not-shown fixing bolts using the fixing hole 43a, 43b and 43c. At this moment, since each of the engaging protrusions 41a and each of the engaging protrusions 41b are disposed at approximately intermediate points between the fixing hole 43a and 43b and between 43b and 43c, resonance of the rectifier 14 due to vibrations stemming from the vehicle side or from the alternator itself can be brought under control, so that each component can be relieved from mechanical burden imposed thereon.

As described above, according to Embodiment 1, when assembling the rectifier 14, the heatsinks and the board are unified only by press-fitting into the plurality of engaging holes 31a and 32a made in the positive-side heatsink 31 and the negative heatsink 32 the engaging protrusions 41a and 41b formed on the circuit board 40, respectively, whereby their assembly becomes simple and takes less working time, which leads to relief for environmental burden throughout the manufacturing process. Moreover, since no extra parts need to be prepared, positioning and fixing of the three parts, that is, the positive-side heatsink 31, the negative-side heatsink 32, and the circuit board 40, can be easily performed.

Furthermore, no special jigs are needed as in the case of fixing with rivets, enabling the rectifier to be manufactured at low-costs. Moreover, since each of the engaging protrusions 41a and each of the engaging protrusions 41b are located at approximately intermediate points between the fixing hole 43a and 43b and between 43b and 43c, resonance of the rectifier 14 due to vibrations stemming from the vehicle side or from the alternator itself can be brought under control, so that each component can be relieved from mechanical burden imposed thereon. In addition, since knockout pins are provided in the mold die at locations corresponding to the tips of the engaging protrusions, thereby allowing workpieces to be released from the die, the circuit board can be manufactured easily. Thanks to those effects, manufacturing costs can be cut down, as well as molding efficiency can be enhanced.

Embodiment 2.

Figure 4:
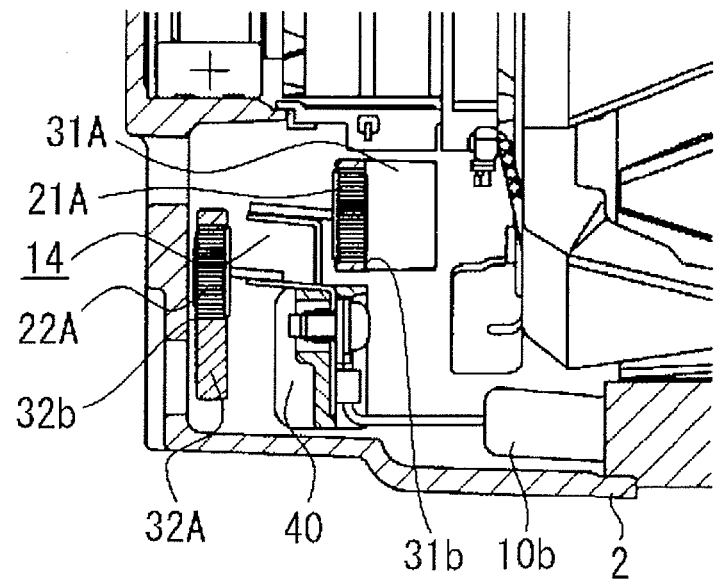
FIG. 4 is an essential-portion cross sectional view showing an alternator according to Embodiment 2 of the invention.

FIG. 4 is an essential-portion cross sectional view showing an alternator according to Embodiment 2 of the present invention. In the figure, a positive-side diode 21A and a negative-side diode 22A are press-fitted into a rectifier-element-fixing hole 31b and 32b made in a positive-side heatsink 31A and a negative-side heatsink 32A, respectively, whereby those diodes are fixedly held. The structure of fixedly holding the positive-side heatsink 31A, the negative-side heatsink 32A, and the circuit board 40, and other configurations are the same as those in Embodiment 1.

In Embodiment 2 configured as described above, in addition to the same effects brought about in Embodiment 1, the positive-side diode 21A and the negative-side diode 22A can be easily fixed to the positive-side heatsink 31A and negative-side heatsink 32A, respectively, so that the assembly can be further simplified. Therefore, effects of further reducing working time and costs in manufacturing can be brought about.

Embodiment 3.

Figure 5:
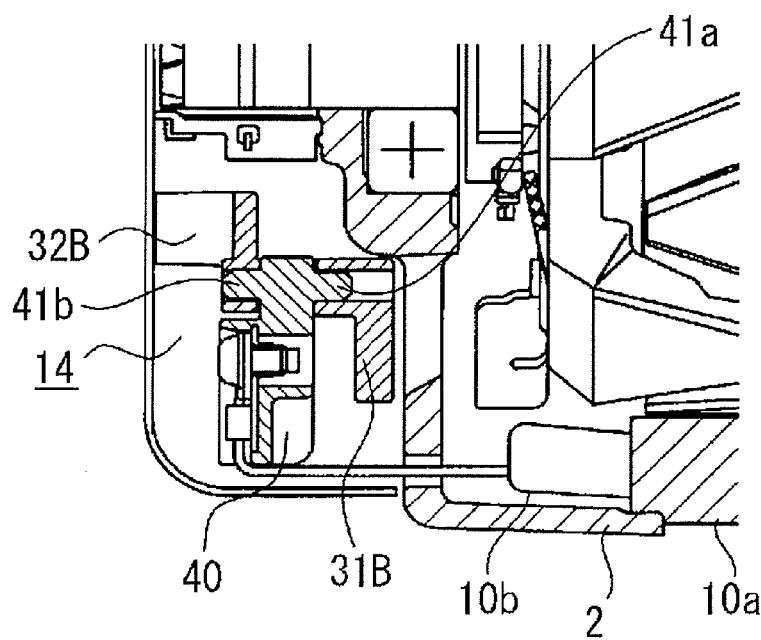
FIG. 5 is an essential-portion cross sectional view showing an alternator according to Embodiment 3 of the invention.

FIG. 5 is an essential-portion cross sectional view showing an alternator according to Embodiment 3 of the present invention. In the figure, the rectifier 14 including the positive-side heatsink 31A, the negative-side heatsink 32D, and the circuit board 40 is disposed outside the rear bracket 2 constituting the case 3, and fastened to the bracket 2 with not-shown fixing bolts. Moreover, rectifier elements used in this configuration may be any type of diodes, such as the positive-side diode 21 and 21A, and the negative-side diode 22 and 22A, exemplified in Embodiment 1 and 2.

In Embodiment 3 configured as described above, the same effects as those in Embodiment 1 or 2 can be brought about.

Embodiment 4.

Figure 6:
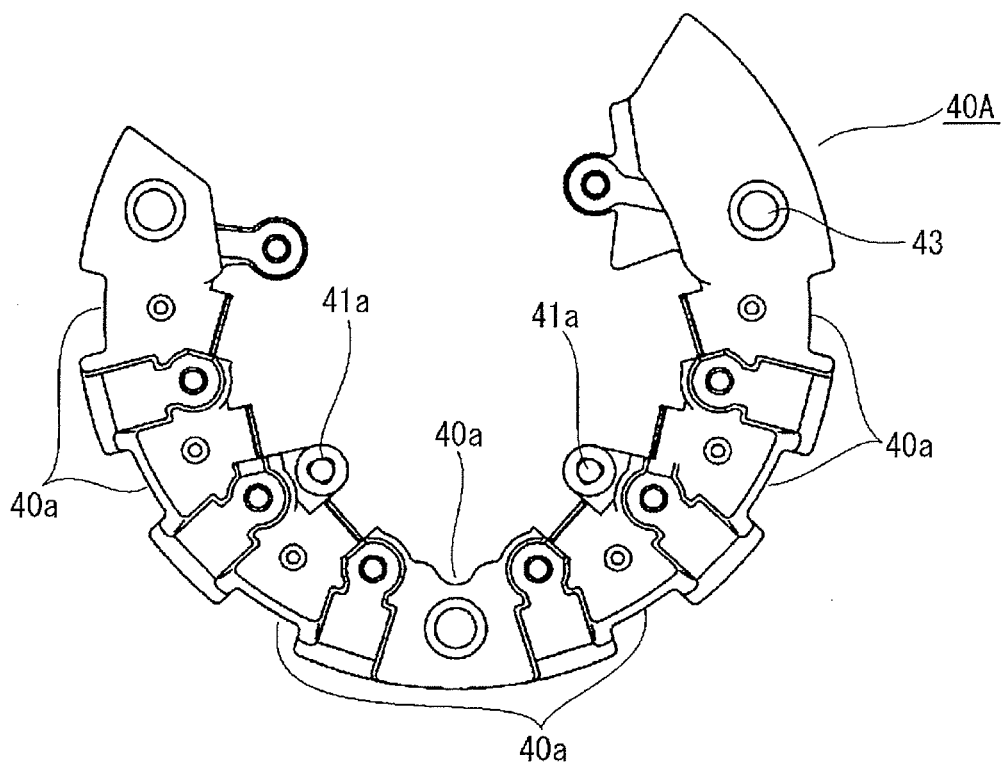
FIG. 6 is a view showing a circuit board used for an alternator according to Embodiment 4 of the invention being viewed from the front side thereof.

FIG. 6 is a view showing a circuit board used for an alternator according to Embodiment 4 of the present invention being viewed from the front side thereof. In the figure, in order to enhance workability in assembling the board with the positive-side and the negative-side heatsink, not shown in the figure, a plurality of notches 40a that enables a circuit board 40A itself to deform easily is provided along the inner and the outer circumferential side of the circuit board 40A formed approximately in an horseshoe shape. Configurations other than that can be made the same as those in Embodiment 1 to 3.

In Embodiment 4 configured as described above, when the engaging protrusions 41a (41b) formed on the circuit board 40A are press-fitted into a plurality of engaging holes made in the positive-side and the negative-side heatsink, not shown in the figure, even if there are some dimensional errors between those protrusions and holes and fluctuations in the dimensions of the engaging protrusions 41a (41b) caused when molding the circuit board 40A, the circuit board 40A deforms subtly thanks to the provision of the plurality of notches 40a along the inner and the outer circumferential side of the circuit board 40A, whereby the heatsinks and the board can be easily assembled together, thereby also improving the workability.

Embodiment 5.

Figure 7:
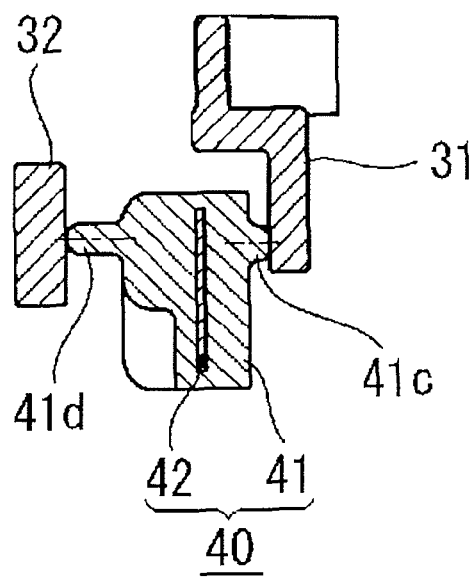
FIG. 7 is a cross sectional view showing the proximity of antivibration protrusions of a circuit board used for an alternator according to Embodiment 5 of the invention.

FIG. 7 is a cross sectional view showing the proximity of antivibration protrusions of a circuit board used for an alternator according to Embodiment 5 of the present invention. In the figure, an antivibration protrusion 41c and 41d that abut the positive-side heatsink 31 and the negative-side heatsink 32, respectively, at predetermined locations on the surfaces thereof are formed at predetermined locations on the insulation resin portion 41 constituting the circuit board 40 identical to that in Embodiment 1. Moreover, the above-described antivibration protrusion 41c and 41d are formed so as to abut the positive-side heatsink 31 and the negative-side heatsink 32 on the surfaces thereof, with the not-shown engaging protrusions 41a and 41b (see FIG. 2) formed on the circuit board 40 being press-fitted into the not-shown plurality of engaging holes 31a and 32a (see FIG. 2) made in the positive-side heatsink 31 and the negative-side heatsink 32, respectively.

In Embodiment 5 configured as described above, the antivibration protrusion 41c and 41d on the insulation resin portion 41 are made to abut the positive-side heatsink 31 and the negative-side heatsink 32, respectively, whereby resonance of the rectifier 14 due to vibrations stemming from the vehicle side and from the alternator itself can be further brought under control, thereby bringing about an effect in that mechanical burden imposed on each component can be alleviated. Moreover, a plurality of either such antivibration protrusions 41c or 41d, or a plurality of both such antivibration protrusions 41c and 41d may be provided. Moreover, although locations where the antivibration protrusion 41c and 41d are provided are not particularly restricted, it is preferable to provide the protrusions at locations that are distant from the engaging portions, such as the fixing holes 43 (43a, 43b and 43c) shown in FIG. 3 and the engaging protrusions 41a and 41b (see FIG. 2), and in which vibrations tend to increase.

Embodiment 6.

Figure 8:
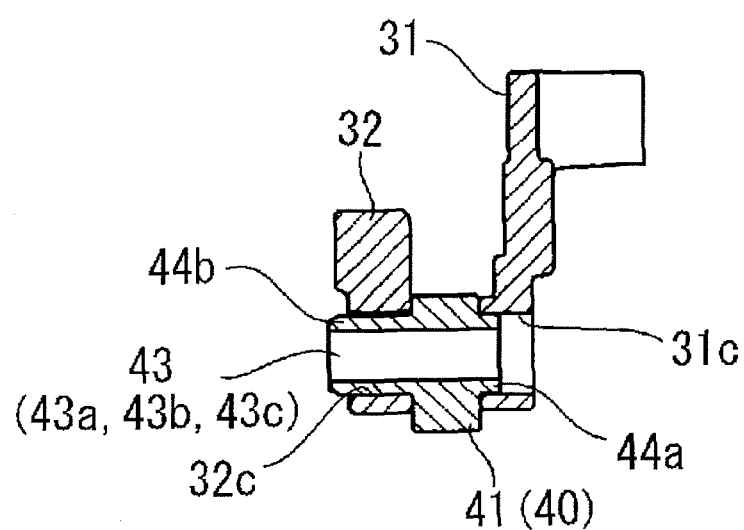
FIG. 8 is a cross sectional view showing the proximity of a fixing hole of a circuit board used for an alternator according to Embodiment 6 of the invention.

FIG. 8 is a cross sectional view showing the proximity of one of the fixing holes of a circuit board used for an alternator according to Embodiment 6 of the present invention. In the figure, inside the fixing holes 43 (43a, 43b and 43c) each made in the insulation resin portion 41 constituting the circuit board identical to that in Embodiment 1 are integrally molded with a cylindrical guide 44a that, when assembling, has a portion which passes into an inside of an insertion through hole 31c for fastening together made in the positive-side heatsink 31, and a cylindrical guide 44b that has a portion which passes into an inside of an insertion through holes 32c for fastening together made in the negative-side heatsink 32. Since configurations other than the above are the same as those in Embodiment 1, their explanation will be omitted.

In Embodiment 6 configured as described above, when the engaging protrusions 41a and 41b (see FIG. 2) formed on the circuit board 40 are press-fitted into the plurality of engaging holes 31a and 32a (see FIG. 2) made in the positive-side heatsink 31 and the negative-side heatsink 32, respectively, the cylindrical guide 44a and 44b at the same time pass through inside the insertion through hole 31c and 32c for fastening together made in the positive-side heatsink 31 and the negative-side heatsink 32, respectively, so that their positioning can be performed. Therefore, an additional effect can be brought about in that workability in assembling the circuit board together with the positive-side heatsink 31 and the negative-side heatsink 32 is further enhanced.

Moreover, it goes without saying that a plurality of inventions can be arbitrarily selected out of the inventions according to Embodiment 1 to 6 and mutually combined. Furthermore, it goes without saying that arrangement of the positive-side heatsink 31 and the negative-side heatsink 32, the number of the engaging protrusions 41a and 41b, and the like can be changed as required within the scope of the spilt of the present invention.

Various modifications and alterations of this invention will be apparent to those skilled in the art without departing from the scope and spirit of this invention, and it should be understood that this is not limited to the illustrative embodiments set forth herein.

What is claimed is:
1. An alternator, comprising:
 a rectifier including a positive-side heatsink and negative-side heatsink for cooling rectifier elements corresponding to each heatsink, and
 a circuit board, having a front side and an opposing rear side, for holding the positive-side heatsink and the negative-side heatsink;

wherein one or more engaging holes are centrally aligned along an axis, the axis being along a longitudinal length of the one or more engaging holes, and provided on at least one of (a) the positive-side heatsink and the negative-side heatsink and (b) opposite sides of the circuit board, and wherein one or more corresponding engaging protrusions that are engaged with each engaging hole, are provided, such that an engaging protrusion is provided on at least one of (c) opposite sides of the circuit board aligned along axis and (d) the positive-side heatsink and the negative-side heatsink aligned along the axis, respectively, and wherein antivibration protrusions, each for abutting a surface of the positive-side heatsink and that of the negative-side heatsink, are formed at predetermined locations on an insulation resin portion constituting the circuit board.

2. The alternator according to claim 1, wherein a plurality of holes identical to the engaging hole is made in each of the positive-side heatsink and the negative-side heatsink, the engaging protrusion is formed of an insulation resin portion constituting the circuit board, and the outer diameter of the protrusion is formed larger than the engaging hole diameter.

3. The alternator according to claim 1, wherein the engaging protrusion is provided with a plurality of rib-like ridges formed on an outer circumferential surface thereof at circumferentially equal intervals.

4. The alternator according to claim 1, wherein the circuit board is formed in an arc and a plurality of notches is provided along an outer and an inner circumferential side of the circuit board so as to ease deformation of the circuit board.

5. An alternator, comprising:

a rectifier including a positive-side heatsink and a negative-side heatsink for cooling rectifier elements corresponding to each heatsink, and a circuit board, having a front side and an opposing rear side, for holding the positive-side heatsink and the negative-side heatsink;

wherein one or more engaging holes are centrally aligned along an axis, the axis being along a longitudinal length of the one or more engaging holes, and provided on at least one of (a) the positive-side heatsink and the negative-side heatsink and (b) opposite sides of the circuit board, and wherein one or more corresponding engaging protrusions that are engaged with each engaging hole are provided, such that an engaging protrusion is provided on at least on of (c) opposite sides of the circuit board aligned along axis and (d) the positive-side heatsink and the negative-side heatsink aligned along the axis, respectively, and wherein a portion of a cylindrical guide is configured to advance into an inside of an insertion through hole for fastening together made in the positive-side heatsink and a portion of another cylindrical guide is configured to advance into an inside of an insertion through hole for fastening together made in the negative-side heatsink are integrally molded with a fixing hole in an insulation resin portion constituting the circuit board.

6. The alternator according to claim 2, wherein an engaging protrusion tip of the engaging protrusion is configured to be releasable from a molding die with knockout pins at a location corresponding to the engaging protrusion tip.

7. The alternator according to claim 1, wherein the engaging protrusion is formed along an inner circumferential side of the rectifier.

8. The alternator according to claim 1, wherein the positive-side heatsink and the negative-side heatsink are held on opposite sides of the circuit board.

9. The alternator according to claim 1, wherein the engaging protrusions are provided back-to-back on the circuit board to fixedly hold the positive-side heatsink and the negative-side heatsink.

10. The alternator according to claim 5, wherein a plurality of holes identical to the engaging hole is made in each of the positive-side heatsink and the negative-side heatsink, the engaging protrusion is formed of an insulation resin portion constituting the circuit board, and the outer diameter of the protrusion is formed larger than the engaging hole diameter.

11. The alternator according to claim 5, wherein the engaging protrusion is provided with a plurality of rib-like ridges formed on an outer circumferential surface thereof at circumferentially equal intervals.

12. The alternator according to claim 5, wherein the circuit board is formed in an arc and a plurality of notches is provided along an outer and an inner circumferential side of the circuit board so as to ease deformation of the circuit board.

13. The alternator according to claim 10, wherein the circuit board is released by a knockout pin provided in a molding die at a location corresponding to the engaging protrusion tip.

14. The alternator according to claim 5, wherein the engaging protrusion is formed along an inner circumferential side of the rectifier.

15. The alternator according to claim 5, wherein the positive-side heatsink and the negative-side heatsink are held on opposite sides of the circuit board.

16. The alternator according to claim 5, wherein the engaging protrusions are provided back-to-back on the circuit board to fixedly hold the positive-side heatsink and the negative-side heatsink.

17. The alternator according to claim 5, wherein the axis is parallel to a rotational axis of the generator.

18. The alternator according to claim 5, wherein the axis is parallel to a rotational axis of the generator.

* * * * *